United States Patent

Jansma

Patent Number: 5,602,444
Date of Patent: Feb. 11, 1997

[54] FLUORESCENT LAMP HAVING ULTRAVIOLET REFLECTING LAYER

[75] Inventor: Jon B. Jansma, Pepper Pike, Ohio

[73] Assignee: General Electric Company, Schenectady, N.Y.

[21] Appl. No.: 519,919

[22] Filed: Aug. 28, 1995

[51] Int. Cl.⁶ ............................ H01J 1/62; H01J 63/04
[52] U.S. Cl. ............................ 313/489; 313/486
[58] Field of Search ............................ 313/486, 489, 313/563, 564, 565, 635, 636, 637, 638, 639, 572, 577

[56] References Cited

U.S. PATENT DOCUMENTS

| | | |
|---|---|---|
| 4,069,441 | 1/1978 | Wanmaker et al. . |
| 4,289,991 | 9/1981 | Schreurs ............................ 313/489 |
| 4,670,688 | 6/1987 | Sigai et al. ............................ 313/489 |
| 4,882,520 | 11/1989 | Tsunekawa et a. ............................ 313/489 X |
| 4,924,141 | 5/1990 | Taubner et al. ............................ 313/489 X |
| 5,008,789 | 4/1991 | Arai et al. . |
| 5,258,689 | 11/1993 | Jan Sma et al. ............................ 313/489 |
| 5,309,069 | 5/1994 | Sigai et al. ............................ 313/486 |
| 5,402,036 | 3/1995 | Ito ............................ 313/489 X |
| 5,512,798 | 4/1996 | Honda ............................ 313/489 |

FOREIGN PATENT DOCUMENTS 0385275   9/1990   European Pat. Off. .

Primary Examiner—Louis M. Arana
Assistant Examiner—Mack Haynes
Attorney, Agent, or Firm—Stanley C. Corwin; George E. Hawranko

[57] ABSTRACT

A fluorescent lamp with an ultraviolet reflecting barrier layer between the glass envelope and the phosphor layer(s). The barrier layer is a blend of gamma alumina and alpha alumina, preferably 5–80 weight percent gamma alumina and 20–95 weight percent alpha alumina. The barrier layer is effective to reflect UV light back into the phosphor layer(s), leading to improved phosphor utilization and more efficient production of visible light.

15 Claims, 2 Drawing Sheets

FLUORESCENT LAMP HAVING ULTRAVIOLET REFLECTING LAYER

BACKGROUND OF THE INVENTION

1. Field of the Invention

The present invention relates generally to fluorescent lamps and more particularly to a fluorescent lamp having an improved ultraviolet reflecting barrier layer.

2. Description of Related Art

Thin protective coatings applied over the inner glass surface of fluorescent lamp tubes have been used for improving lumen maintenance, reducing mercury consumption, reducing end discoloration and for specialized lamps which contain conductive starting aids. The coating forms a barrier between the layer of phosphor particles and the glass bulb tubing or glass tube.

Fluorescent lamp barrier coatings typically comprise alumina or silica particles ranging in size from 10–100 nm in diameter. These coatings are thin (generally less than 1 µm, usually less than 0.5 µm in thickness) and highly transparent to visible light. Some ultraviolet light is beneficially reflected back into the phosphor layer(s), however, the main purpose of the barrier is to provide a chemically inert boundary between the phosphor layer and the glass.

There is a need for a barrier layer which more effectively reflects UV light back into the phosphor layer. Efficient reflection of UV light is highly desirable due to the resulting improved phosphor utilization, which becomes particularly important when expensive rare earth phosphors are used.

SUMMARY OF THE INVENTION

A fluorescent or mercury vapor discharge lamp is provided, having a light-transmissive envelope, means for providing a discharge, a discharge-sustaining fill gas sealed inside the envelope, a phosphor layer inside the envelope and adjacent the inner surface of the envelope, and a barrier layer between the envelope and the phosphor layer. The barrier layer comprises a blend of gamma alumina and alpha alumina, the alumina blend being 5–80 weight percent gamma alumina and 20–95 weight percent alpha alumina.

DETAILED DESCRIPTION OF THE PREFERRED EMBODIMENTS OF THE INVENTION

Figure 1:
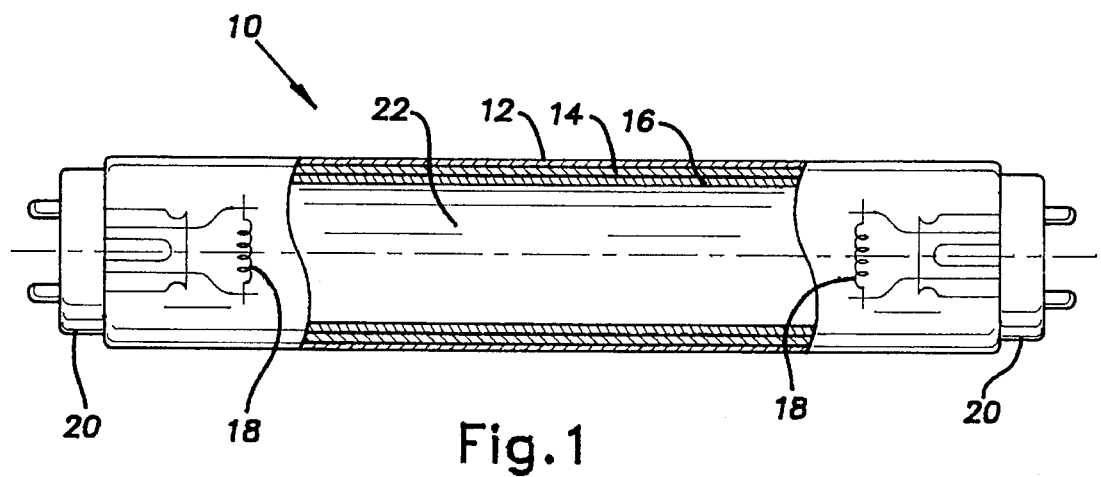
FIG. 1 shows diagrammatically, and partially in section, a fluorescent lamp according to the present invention.

With reference to FIG. 1, there is shown a representative low pressure mercury vapor discharge fluorescent lamp 10, which is generally well-known in the art. The fluorescent lamp 10 has a glass tube or light-transmissive envelope 12 which has a circular cross section. The inner surface of the glass tube is provided with an ultraviolet reflecting barrier layer 14 according to the present invention. The inner surface of the barrier layer 14 is provided with a phosphor layer 16, the barrier layer 14 being between the envelope 12 and the phosphor layer 16. Phosphor layer 16 is preferably a rare earth phosphor layer, such as a rare earth triphosphor layer, but it may also be a halophosphate phosphor layer or any other phosphor layer as known in the art that absorbs UV light.

Optionally other layers may be provided inside the envelope; for example adjacent to or between the layers 14 and 16, such as for example multiple phosphor layers may be provided, for example a halophosphate phosphor layer may be provided between the barrier layer and a rare earth triphosphor layer.

The lamp is hermetically sealed by bases 20 attached at both ends, and electrode structures 18 (to provide an arc discharge) are respectively mounted on the bases 20. The pair of spaced electrodes is a means for providing a discharge. A discharge-sustaining fill gas 22 is provided inside the sealed glass tube, the fill gas being typically an inert gas such as argon or a mixture of argon and other noble gases at a low pressure in combination with a small quantity of mercury to provide the low vapor pressure manner of lamp operation.

The invented ultraviolet reflecting barrier layer is preferably utilized in a low pressure mercury vapor discharge lamp, but may also be used in a high pressure mercury vapor discharge lamp. The invented barrier layer may be used in fluorescent lamps having electrodes as is known in the art, as well as in electrodeless fluorescent lamps as are known in the art, where the means for providing a discharge is a structure which provides high frequency electromagnetic energy or radiation.

The barrier layer of the present invention beneficially reflects UV light back into the phosphor layer or layers where it may be utilized, leading to improved phosphor utilization and more efficient production of visible light. Lamps with the invented barrier layer also 1) require lower quantities of mercury, 2) have lower UV emission, 3) have a recyclable design in that the-triphosphors are more easily reclaimed, and 4) have an improved appearance due to the opaque white barrier layer.

The barrier layer 14 is or contains a blend of gamma alumina particles and alpha alumina particles. The gamma alumina particles have a surface area of 30–140, more preferably 50–120, more preferably 80–100, $m^2/gm$ and a particle size (diameter) of preferably 10–500, more preferably 30–200, more preferably 50–100, nm. The alpha alumina particles have a surface area of 0.5–15, more preferably 3–8, more preferably 4–6, more preferably about 5, $m^2/gm$ and a particle size (diameter) of preferably 50–5000, more preferably 100–2000, more preferably 500–1000, more preferably about 700, nm.

The alumina particle blend in the barrier layer is 5–80, more preferably 10–65, more preferably 20–40, more preferably 25–35, more preferably about 30, weight percent gamma alumina and 20–95, more preferably 35–90, more preferably 60–80, more preferably 65–75, more preferably about 70, weight percent alpha alumina.

The barrier layer 14 is provided on the lamp as follows. The gamma alumina and alpha alumina particles are blended by weight. The particles should be substantially pure or of high purity substantially without light-absorbing impurities or with a minimum of light-absorbing impurities. The alumina is then dispersed in a water vehicle with a dispersing agent such as ammonium polyacrylate and optionally other agents known in the art, the resulting suspension being about 5–15 weight percent alumina and 1–3 weight percent dispersing agent. The suspension is then applied as a coating to the inside of the glass tube and heated, as phosphor coatings are applied and heated, which is known in the art. In the heating stage the non-alumina components are driven off, leaving only the alumina behind. The barrier layer is applied so that the weight of alumina in the coating or barrier layer (the "coating weight") is 0.1–3, more preferably 0.3–1, more preferably 0.5–0.7, more preferably about 0.6, mg of alumina per cm².

When a low pressure mercury vapor discharge lamp is provided with a barrier layer according to the present invention, reflectance of UV light (particularly at 254 nm), relative to barium sulfate, is preferably at least 50%, more preferably at least 70%, more preferably at least 80%, more preferably at least 90%, preferably about 70–95%, more preferably about 80–90%.

The following Examples further illustrate various aspects of the invention. All percentages are weight percent unless otherwise indicated.

EXAMPLE 1

Alumina coatings were applied on flat glass slides and measured using a SPEX diffuse reflectance spectrometer. The reflectance values indicated are relative to a barium sulfate standard at 254 nm wavelength, which is the main low pressure mercury vapor lamp discharge emission wavelength. Sample A was approx. 99% gamma alumina having a surface area of 90–100 m²/gm. Sample B was approx. 99% alpha alumina having a surface area of 4–6 m²/gm. Sample C was 70% alpha alumina as used in Sample B and 30% gamma alumina as used in Sample A.

Coating weight is in mg/cm². Sample A is difficult to coat and use above about 0.55 mg/cm².

| Sample A | | Sample B | | Sample C | |
|---|---|---|---|---|---|
| Coating weight | Reflectance | Coating weight | Reflectance | Coating weight | Reflectance |
| 0.080 | 12.3% | 0.32 | 46.7% | 0.13 | 43.2% |
| 0.147 | 14.2% | 0.47 | 56.2% | 0.26 | 60.2% |
| 0.276 | 20.9% | 0.64 | 62.4% | 0.41 | 69.2% |
| 0.295 | 28.3% | 0.77 | 70.6% | 0.52 | 74.9% |
| 0.418 | 24.5% | 0.98 | 74.0% | 0.57 | 84.1% |
| 0.520 | 37.9% | 1.71 | 82.3% | 0.95 | 87.2% |
| | | 10.4 | 92.4% | 1.23 | 88.9% |
| | | | | 1.79 | 93.2% |

At equivalent coating weights, the invention has greater reflectance. This was surprising and unexpected.

EXAMPLE 2

An experiment similar to Example 1 was performed. The samples tested were blends of alpha alumina (4–6 m²/gm surface area) and gamma alumina (90–100 m²/gm surface area). The percent listed is alpha alumina, the balance is gamma alumina. Reflectance is relative to a barium sulfate standard at 254 nm. Coating weight is mg/cm².

| Percent Alpha Alumina | Coating Weight | Reflectance |
|---|---|---|
| 100.0% | 1.17 | 86.0% |
| 91.3% | 1.16 | 90.8% |
| 82.2% | 1.13 | 92.5% |
| 76.1% | 1.08 | 93.8% |
| 68.2% | 1.03 | 94.9% |
| 61.4% | 1.08 | 93.7% |
| 54.0% | 1.07 | 93.4% |
| 46.6% | 1.03 | 90.7% |
| 37.7% | 1.13 | 91.7% |
| 0.0% | 1.18 | 85.8% |

EXAMPLE 3

Figure 2:
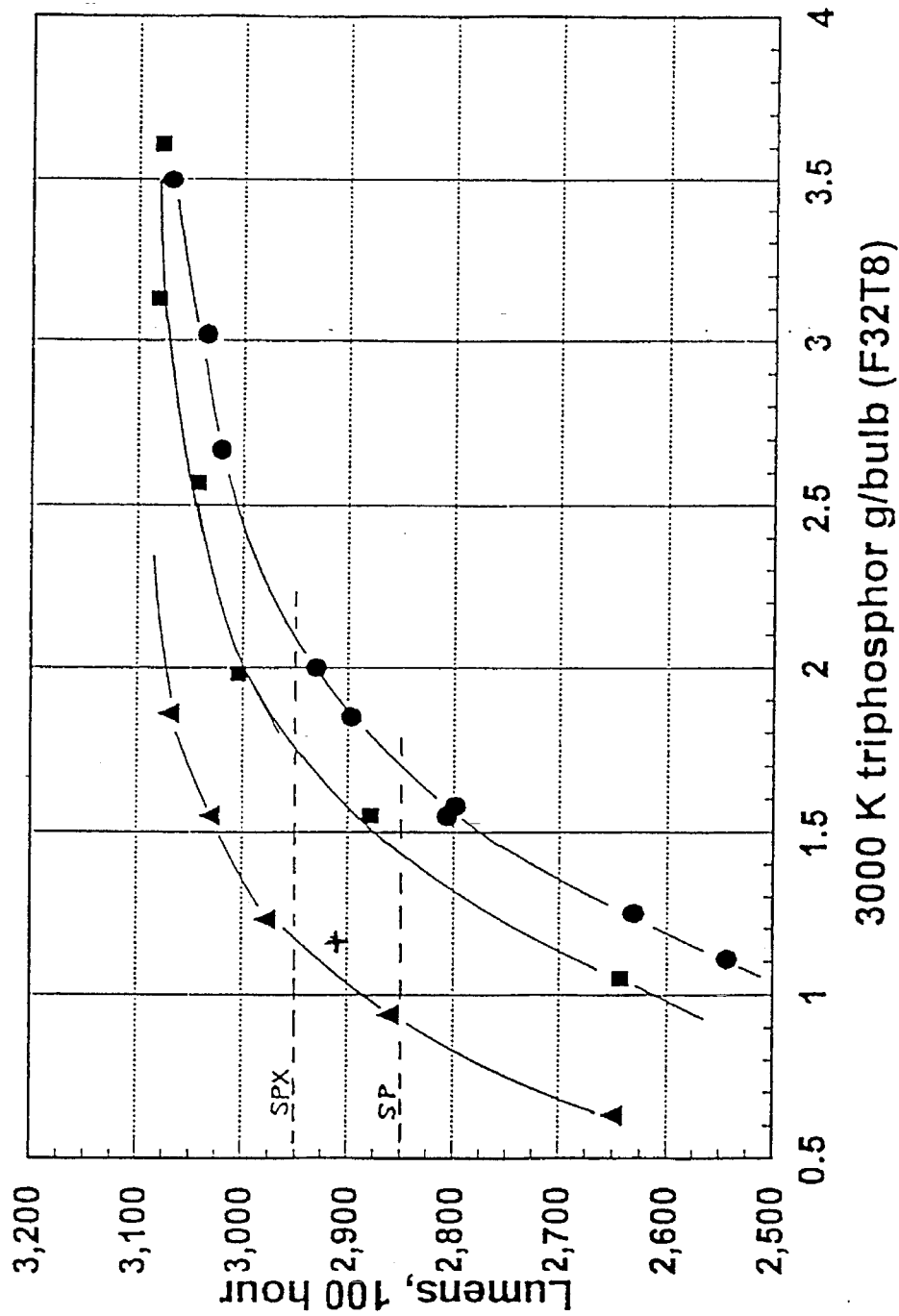
FIG. 2 is a graph plotting lumens measured after 100 hours of lamp operation for various lamps.

FIG. 2 illustrates the results of a series of tests using a 32 watt four foot T8 flourescent lamp. The bottom horizontal axis indicates grams of 3000K triphosphor per lamp. The left-side vertical axis indicates the number of lumens measured after 100 hours of lamp operation. The black triangles indicate lamps where a barrier layer of the present invention was provided beneath the triphosphor layer, the barrier layer being 70% alpha alumina (4–6 m²/gm surface area) and 30% gamma alumina (90–100 m²/gm surface area) at a coating weight of 0.5 mg/cm². The black squares indicate a gamma alumina (90–100 m²/gm surface area) barrier layer at a coating weight of 0.4 mg/cm². The black circles indicate lamps with no barrier layer. The black cross indicates a lamp having no barrier layer, but having a halophosphor layer beneath the triphorsphor layer, the halophosphor layer being present in a coating weight of 2.5 mg/cm². The dashed SP line indicates the 2850 lumen rating which a standard fluorescent lamp is required to meet; the dashed SPX line indicates the 2950 lumen rating which a deluxe fluorescent lamp is required to meet. The graph of FIG. 2 illustrates that lamps having the invented barrier layer perform significantly better than those without. These results were both surprising and unexpected.

Although the preferred embodiments of the invention have been shown and described, it should be understood that various modifications and rearrangements of the parts may be resorted to without departing from the scope of the invention as disclosed and claimed herein.

What is claimed is:

1. A mercury vapor discharge lamp comprising a light-transmissive envelope having an inner surface, means for providing a discharge, a discharge-sustaining fill gas sealed inside said envelope, a phosphor layer inside the envelope and adjacent the inner surface of the envelope, and a barrier layer between the envelope and the phosphor layer, the barrier layer comprising a blend of gamma alumina and alpha alumina, said alumina blend being 5 to 80 weight percent gamma alumina and 20 to 95 weight percent alpha alumina.

2. A lamp according to claim 1, wherein said alumina blend is 10 to 65 weight percent gamma alumina and 35 to 90 weight percent alpha alumina.

3. A lamp according to claim 2, wherein said alumina blend is 20 to 40 weight percent gamma alumina and 60 to 80 weight percent alpha alumina.

4. A lamp according to claim 1, wherein said alumina blend is present in said barrier layer in a coating weight of 0.1 to 3 mg/ cm².

5. A lamp according to claim 4, wherein said alumina blend is present in said barrier layer in a coating weight of 0.3 to 1 mg / cm².

6. A lamp according to claim 5, wherein said alumina blend is present in said barrier layer in a coating weight of 0.5 to 0.7 mg/cm².

7. A lamp according to claim 1, wherein said phosphor layer is a rare earth phosphor layer.

8. A lamp according to claim 7, further comprising a halophosphate phosphor layer between said barrier layer and said rare earth phosphor layer.

9. A lamp according to claim 1, said gamma alumina having a surface area of 30 to 140 m²/gm and said alpha alumina having a surface area of 0.5 to 15 m²/gm.

10. A lamp according to claim 9, said gamma alumina having a surface area of 50 to 120 m²/gm and said alpha alumina having a surface area of 3 to 8 m²/gm.

11. A lamp according to claim 1, wherein said alumina blend is present in said barrier layer in a coating weight effective to provide at least 70% reflectance relative to barium sulfate of UV light at 254 nm.

12. A lamp according to claim 11, wherein said alumina blend is present in said barrier layer in a coating weight effective to provide at least 80% reflectance relative to barium sulfate of UV light at 254 nm.

13. A lamp according to claim 1, said lamp being a low pressure mercury vapor discharge lamp having a pair of spaced electrodes.

14. A lamp according to claim 1, the barrier layer consisting essentially of a blend of gamma alumina and alpha alumina, said alumina blend being 10 to 65 weight percent gamma alumina and 35 to 90 weight percent alpha alumina.

15. A lamp according to claim 14, said lamp being a low pressure mercury vapor discharge lamp having a pair of spaced electrodes, said phosphor layer being a rare earth phosphor layer, said alumina blend being present in said barrier layer in a coating weight effective to provide at least 70% reflectance relative to barium sulfate of UV light at 254 nm.

* * * * *